United States Patent [19]
Dutkiewicz et al.

[11] Patent Number: 5,629,960
[45] Date of Patent: May 13, 1997

[54] METHOD FOR REDUCING DISTORTION EFFECTS ON DC OFF-SET VOLTAGE AND SYMBOL CLOCK TRACKING IN A DEMODULATOR

[75] Inventors: Marek K. Dutkiewicz, Delta; Philip J. Houghton, Surrey, both of Canada

[73] Assignee: Sierra Wireless, Inc., Richmond, Canada

[21] Appl. No.: 450,947

[22] Filed: May 22, 1995

[51] Int. Cl.⁶ .................. H03D 1/06; H04B 1/12
[52] U.S. Cl. .......... 375/346; 375/326; 375/340; 370/278; 370/282; 455/78; 455/334
[58] Field of Search .................. 375/346, 348, 375/340, 285, 326, 219; 370/60, 94.1, 94.2, 24, 100.1, 101, 102, 105.1, 29, 105.3, 32, 276, 277; 455/75, 78, 84, 136, 283, 296, 308, 334; 330/133

[56] References Cited

U.S. PATENT DOCUMENTS

| | | | |
|---|---|---|---|
| 4,105,975 | 8/1978 | Sanders et al. | 375/346 |
| 4,238,850 | 12/1980 | Vance | 370/278 |
| 4,318,128 | 3/1982 | Sauvanet | 348/465 |
| 4,480,327 | 10/1984 | Vance | 370/278 |
| 4,510,595 | 4/1985 | Glance et al. | 370/278 |
| 4,520,474 | 5/1985 | Vilmur | 370/278 |
| 4,870,370 | 9/1989 | Hedberg et al. | 330/133 |
| 4,956,876 | 9/1990 | Koshishi | 455/78 |
| 4,982,442 | 1/1991 | Sarokhanian | 455/78 |
| 5,140,699 | 8/1992 | Kozak | 455/84 |
| 5,239,686 | 8/1993 | Downey | 455/78 |

FOREIGN PATENT DOCUMENTS

0580089A1  1/1994  European Pat. Off. .

Primary Examiner—Wellington Chin
Assistant Examiner—William Luther
Attorney, Agent, or Firm—Burns, Doane, Swecker & Mathis, LLP

[57] ABSTRACT

A method for reducing the effects of transients on the DC off-set tracking stage and the symbol timing recovery stage in a full duplex or half duplex packet switched data communication system-in which transients occur in the receiver portion of the subscriber when the transmitter portion of a subscriber is keyed ON and OFF is described. The method is dynamically implemented such the DC tracking stage and the symbol timing recovery stage are set in a first "distortion ready" mode during the time that the transmitter is keyed on and off and is set back to a second "normal" mode after the transmission event is over. In the "distortion ready" mode, the symbol timing recovery stage is set in a "freeze" state such that it makes no further timing adjustments to a decision clock that it generates and the DC off-set recovery stage is set to a narrow bandwidth mode such that it does not track large variations in the DC off-set and amplitude in the received signal. As a result, the Tx/on and Tx/off transients do not upset the decision clock synchronization with the forward channel data stream and the DC off-set tracking stage remains stable.

14 Claims, 4 Drawing Sheets

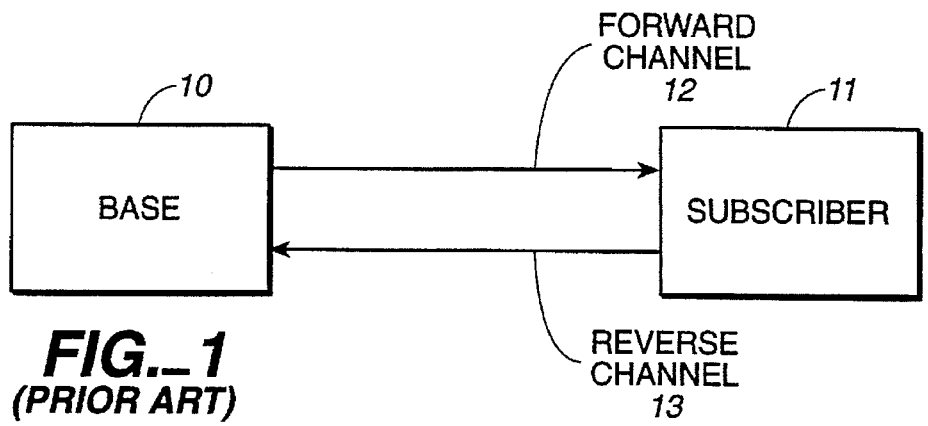
FIG._1
*(PRIOR ART)*
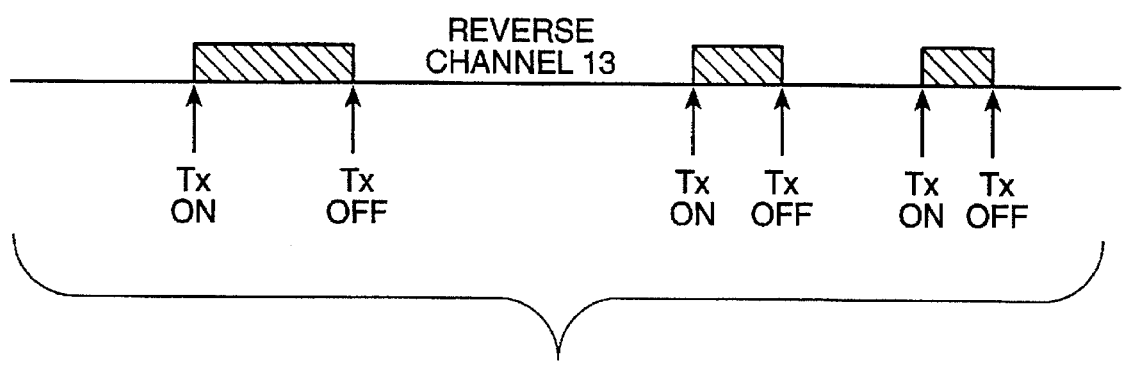
FIG._2
*(PRIOR ART)*

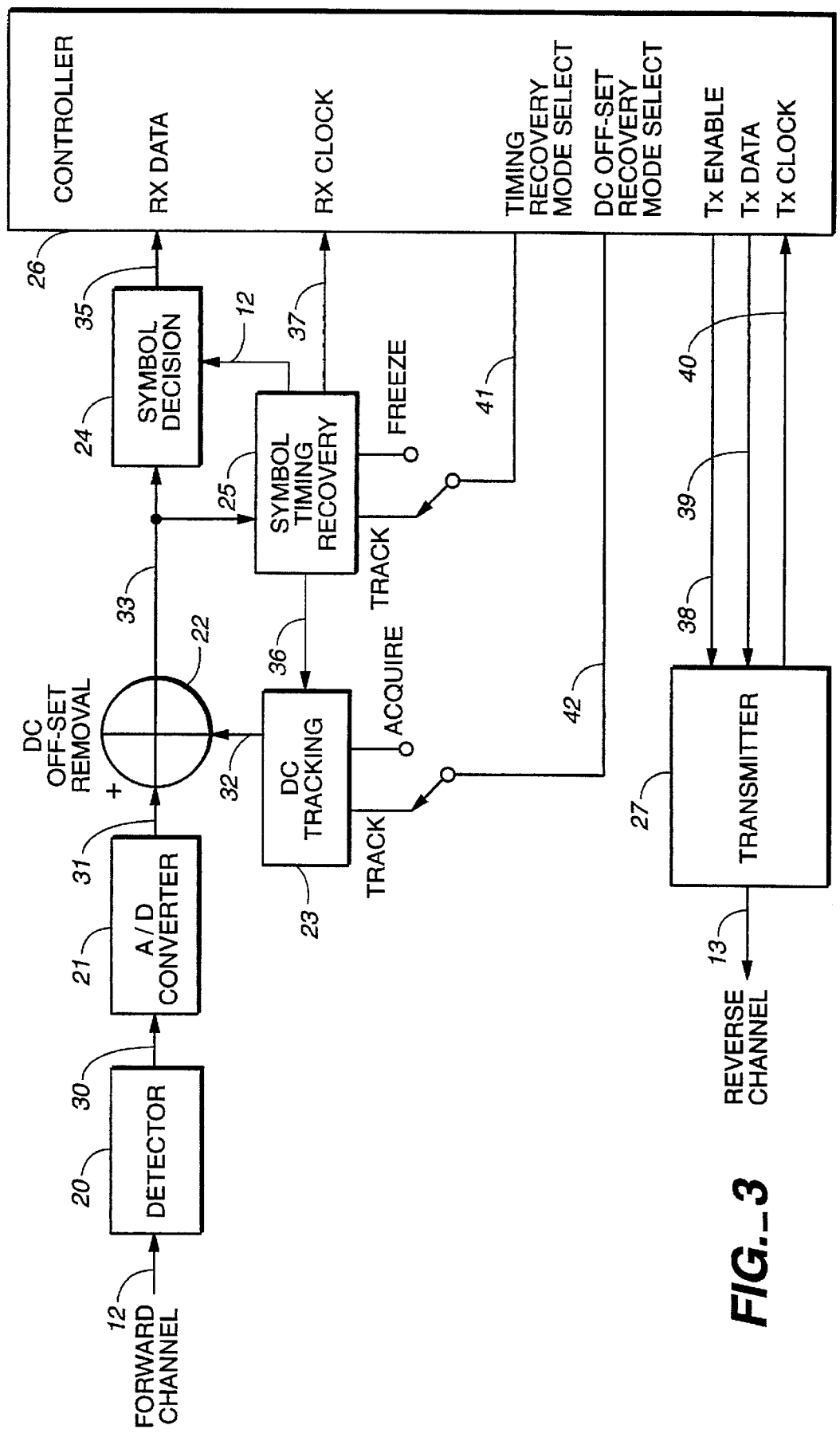
FIG._3

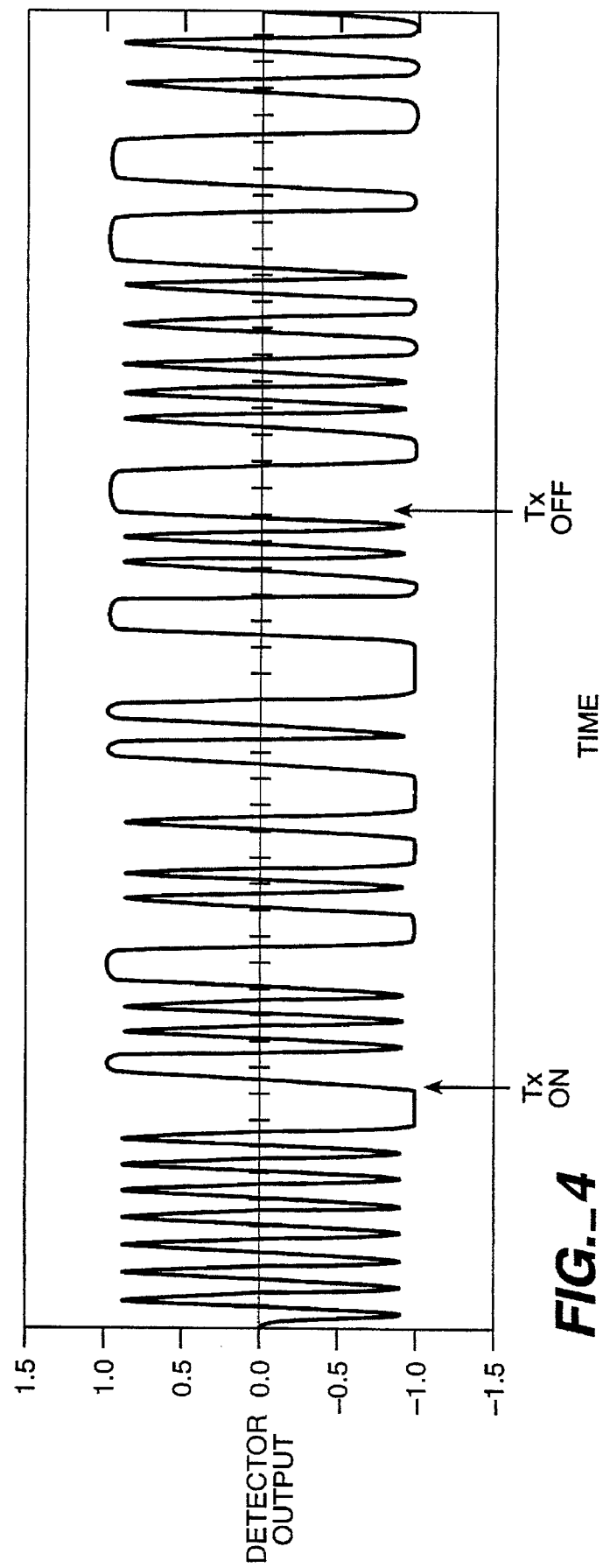
FIG._4

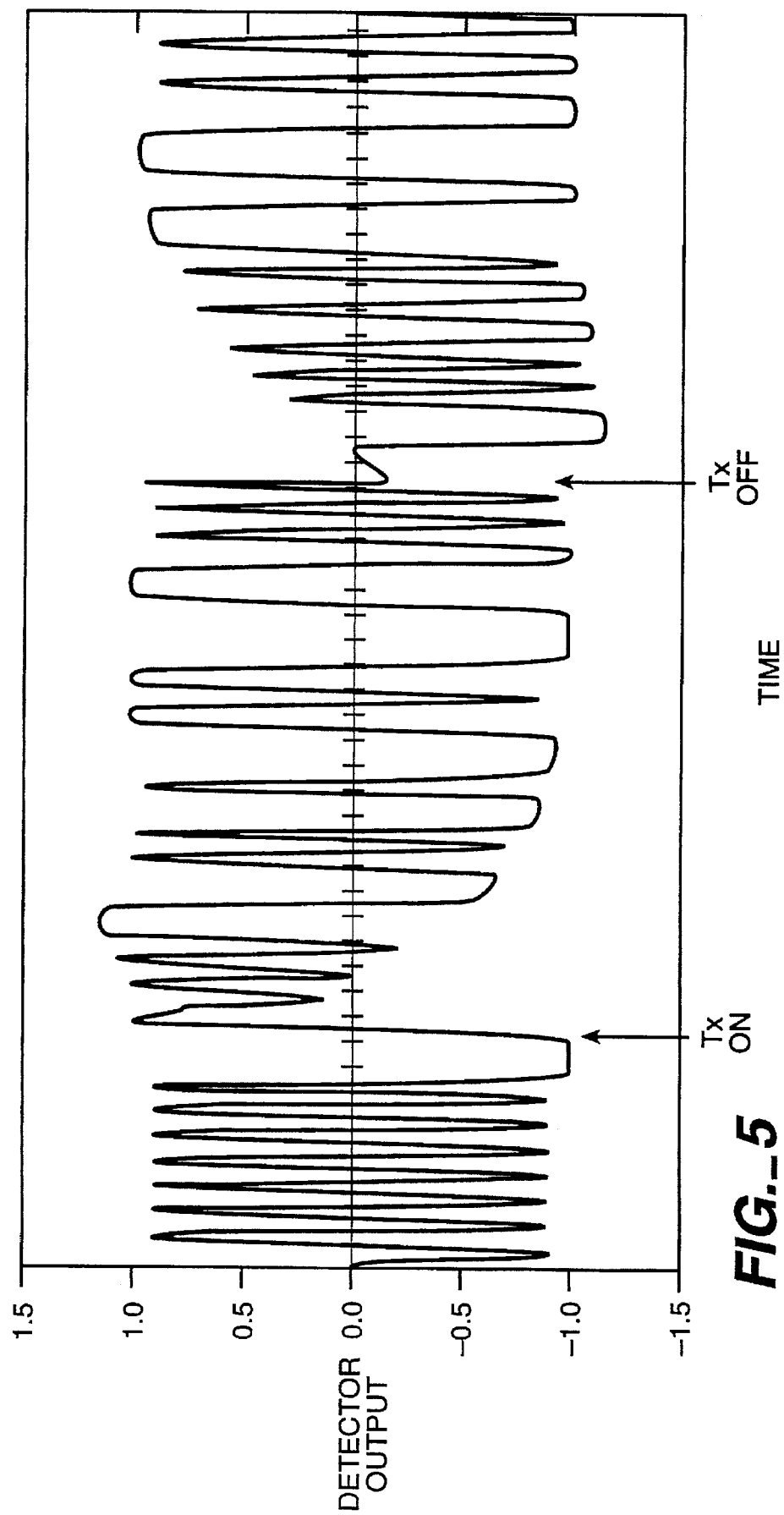
FIG._5

METHOD FOR REDUCING DISTORTION EFFECTS ON DC OFF-SET VOLTAGE AND SYMBOL CLOCK TRACKING IN A DEMODULATOR

BACKGROUND OF THE INVENTION

1. Field of the Invention

The present invention relates to the field of communication systems and particularly to demodulator transients occurring in a receiver.

2. State of the Art

A duplex packet switched data communication system typically includes an information source (referred to as the base) for continuously transmitting a data signal on a forward system channel to an information destination (also referred to as the subscriber). The subscriber, in turn, intermittently transmits packets of data signals back to the base on a reverse channel. The subscriber generally includes a receiver portion for receiving the data signal and a transmitter portion for transmitting the data packets.

Once received, the receiver portion of the subscriber typically filters, band limits, and amplifies the received signal. Next, the signal is demodulated in order to separate the information signal (i.e. the modulating signal) from a carrier signal. After demodulation, the information signal is converted to a digital signal by an analog-to-digital (A/D) converter and then processed through a DC off-set removal stage, a DC tracking stage, and a symbol timing recovery stage.

The DC tracking stage derives the mean DC off-set of the digital information signal and then determines the voltage difference between this mean DC off-set and the DC off-set of a sample of the digital information signal. This voltage difference is then subtracted from the digital information signal by the DC off-set removal stage.

The symbol timing recovery stage derives a decision clock having the same data symbol rate or a multiple of the data symbol rate of the original information signal. It is responsive to the mean DC off-set of the digital signal.

The transmitter portion of the subscriber filters, amplifies, and modulates packets of data signals before transmitting them on the reverse channel. In order to ensure signal integrity across the communication medium, the modulated signal is transmitted at high powers ranging from tenths of a Watt to many tens of Watts. The energy transmitted on the reverse channel represents a large change in the electric and magnetic field strength around the subscriber's transmitter/receiver portions from the time the data packet is transmitted on the reverse channel by keying the transmitter portion ON at the start of the packet and keying the transmitter portion OFF at the end of the packet.

What often occurs in this type of communication system is that the ON/OFF keying action of the transmitter portion typically causes transient behavior in the receiver portion of the subscriber. This transient behavior is due to radiative and conductive interference occurring at the on-set and termination of the intermittent data packet transmissions, (in other words during the ON/OFF keying periods of the transmitter portion).

In an ideal case in which no transients occur, a signal received on the forward channel and subsequently demodulated has a fixed amplitude and DC offset level. As a result, the DC off-set tracking stage and the symbol timing recovery stage function as expected. However, in the case in which transient interference occurs, signals received by the subscriber are distorted with large DC offset variations and amplitude variations at the ON/OFF transmitter key times. When these distorted received signals are subsequently demodulated and A/D converted, the distortion manifests itself as variations in the mean DC offset and amplitude of the digital information signal (in the case of a non-coherent demodulator) and, in the case of a coherent demodulator, the transient distortion on the forward channel is seen as variations in the carrier frequency and the vector magnitude of the demodulated signal.

Due to the variations in the digital information signal the DC off-set tracking stage and the symbol timing recovery stage lose synchronization with the system channel signal. Loss of synchronization results in degradation of the received signal or complete loss of the forward channel signal.

SUMMARY OF THE INVENTION

The present invention is a method for reducing the effects of demodulator transients on the DC off-set tracking stage and the symbol timing recovery stage in a duplex packet switched data communication system. Demodulator transients occur in the receiver portion of the subscriber when the transmitter portion of a subscriber is keyed ON and OFF. The transients cause large variations in the mean DC off-set and the gain of the signal coupled to the DC tracking stage and timing recovery stage. As a result, these stages lose synchronization with respect to the forward channel signal.

The present invention is a method that avoids the adverse transient effect on the DC off-set tracking stage by setting it to a wider bandwidth tracking mode just before the key ON time and until a short time after the key OFF time. The DC off-set tracking stage is less affected by the transients in a narrower bandwidth mode than a broader bandwidth mode since large transient variations in voltage levels are less evident over a narrower spectrum of frequencies.

The method of the present invention also eliminates the effect of transients on the timing recovery stage by setting it to a freeze mode just before the key ON time and until a short time after the key OFF time. In this mode, the timing recovery stage does not track the distorted signal and thereby does not make any timing adjustments to its corresponding derived decision clock. As a result, the decision clock maintains the same rate for the time period in which the timing recovery stage is set in the freeze mode.

BRIEF DESCRIPTION OF THE DRAWINGS

FIG. 1 illustrates a duplex packet switched data communication system.

FIG. 2 illustrates forward and reverse channel signals in the system as shown in FIG. 1.

FIG. 3 illustrates the subscriber portion of the system shown in FIG. 1.

FIG. 4 illustrates an ideal received forward channel signal as seen at the output of a subscriber detector.

FIG. 5 illustrates a non-ideal received forward channel signal as seen at the output of a subscriber detector.

DETAILED DESCRIPTION

A method for minimizing or preventing loss of forward channel synchronization of the DC tracking stage and symbol timing recovery stage in a duplex switched communication system is described. In the following description, numerous specific details are set forth, such as particular signal processing steps in order to provide a thorough understanding of the present invention. It will be obvious, however, to one skilled in the art that these specific details need not be employed to practice the present invention. In other instances, well-known signal processing theory and steps have not been described in detail in order to avoid unnecessarily obscuring the present invention.

FIG. 1 illustrates a switched duplex communication system in which a base 10 continuously transmits data on a forward channel 12 and continuously receives data on a reverse channel 13. Base 10 is typically coupled to more than one subscriber. Subscriber 11 continuously receives data on forward channel 12 and intermittently transmits data back to base 10 on reverse channel 13. FIG. 2 illustrates signal transmission on forward channel 12 and reverse channel 13. As can be seen, a continuous stream of data is being transmitted along forward channel 12, whereas intermittent packets of data are being transmitted along reverse channel 13.

Before an information signal is transmitted on the forward and reverse channels, it is first modulated to put it into condition for transmission. Base 10 modulates the information signal that is to be transmitted on the forward channel and subscriber 11, in turn, demodulates or recovers the information signal encoded in the data signal it receives on forward channel 12.

FIG. 3 shows a portion of a typical subscriber system. Detector 20 recovers/detects the encoded information signal transmitted on forward channel 12 and outputs (on line 30) a demodulated analog signal corresponding to the original information signal. The detected signal is then conditioned by processing it through several stages.

First, the analog demodulated signal is converted into digital form by analog-to-digital (A/D) converter 22. Next, the converted digital signal is processed through DC off-set removal stage 22 which subtracts an off-set voltage 32 from the converted digital signal.

The digital output signal 33 is coupled to symbol decision stage 24 which samples signal 33 at a rate determined by decision clock 34 and outputs digital signal 35 to controller 26. Digital signal 35 represents the original information signal. Controller 26 may then perform other operations on signal 35 if necessary.

DC tracking stage 23 performs two functions. First, it tracks the mean DC off-set of digital signal 33 based on voltage samples provided by stage 25. The voltage samples used for determining the mean DC off-set are dependent on the bandwidth of tracking stage 23. Second, DC tracking stage 23 provides off-set voltage 32. This voltage is determined by subtracting the most recently received sample voltage 36 from the current tracked mean DC off-set voltage. The bandwidth of tracking stage 23 is set to either a "track" or an "acquire" mode by controller 26. The track mode is a narrow bandwidth mode in which the DC off-set loop bandwidth is relatively small, reducing the effects on noise on the tracking sub-system and allowing the sub-system to adapt relatively slowly. The acquire mode is a wider bandwidth mode in which the DC off-set loop bandwidth is relatively large, allowing the tracking system to adapt to the received signal and establish a synchronized situation relatively quickly.

Symbol timing recovery stage 25 also performs two functions. First, it derives decision clock 34 from digital signal 33. It is well known in the art of communications design that in order to accurately ascertain the original information signal from a transmitted modulated signal is necessary to obtain a decision clock signal that is harmonically related to the transmitted symbol rate. In the subscriber system shown in FIG. 3, derived decision clock signal 34 controls the time at which symbol decision stage 24 samples digital input signal 33 and consequently determines what data is passed to controller 26. The decision clock or a multiple of the decision clock (e.g. 2 time the decision clock rate) is also coupled to controller 26 (line 37, FIG. 3) and is employed in other processing operations performed by controller 26. Second, symbol recovery stage 25 also provides samples of the DC signal 36 to DC tracking stage 23 at a rate determined by the decision clock. Symbol timing recovery stage 25 outputs a decision clock having a rate harmonically related to the symbol rate of the DC compensated signal 33. Symbol timing recovery stage 25 also has two modes; track and freeze. When set in the 'track' mode, stage 25 has a narrow bandwidth loop filter and it outputs a decision clock signal which it determines from the received signal and adapts slowly to changes in the received signal symbol rate. The narrow bandwidth loop also reduces immunity to noise in the received signal. In 'freeze mode', the decision clock is frozen to the locally generated clock which is very close in rate to that of the received signal symbol rate until such time as the stage 25 is taken out of the freeze mode. This allows the symbol timing recovery stage 25 to flywheel through any transients or interruptions in the received signal. Signal 41 is a digital signal that switches symbol timing recovery stage 25 between track and freeze mode.

Transmitter portion 27 includes elements for putting an information signal into condition for transmitting on reverse channel 13, such as a filter, an amplifier, and a modulator. Controller 26 provides an enable/disable signal on line 38 to transmitter 27 which switches between a "Tx/on" state that enables transmitter 27 and a "Tx/off" state that disables the transmitter. Data to be transmitted (Tx Data) is also provided by controller 26 (line 39). Clock 40 is a data request clocking signal generated by the transmitter for requesting data from controller 26.

As illustrated in FIG. 2, a packet of data is transmitted between the time that the transmitter is keyed on (i.e. the time at which the transmitter receives the Tx/on enable signal) and the time that the transmitter is keyed off (i.e. the time at which the transmitter receives the Tx/off disable signal). During this time, the data packet is greatly amplified, commonly by at least two orders of magnitude.

In the ideal case, this transmitter keying on/off action does not cause any distortion in signals seen at the output of detector 20. FIG. 4 shows an ideal non-distorted received forward channel signal 50 having a fixed amplitude and DC off-set level at the Tx/on and Tx/off times. In the non-ideal case, the transmitter keying action causes distortion in the output signal of detector 20. Specifically, transients are generated in the received signal due to the proximity of the receiver and transmitter portions in subscriber 11 and due to the large changes (i.e. increase/decrease) in amplification of the transmitted data packets at the Tx/on and Tx/off times in the transmitter. As shown in FIG. 5 this distortion causes large shifts in the DC off-set and variations in amplitude of the received forward channel signal 51 at the Tx/on and Tx/off times.

This distortion adversely effects both the DC tracking stage and the symbol timing recovery stage. Symbol timing is affected since stage 25 is responsive to the amplitude of signal 33. The large amplitude variations in signal 33 causes the rate of the decision clock signal 34 to become unsynchronized with the forward channel signal. When this occurs, the received data (Rx Data) becomes inaccurate, since the decision clock determines when data signal 33 is sampled.

Further, the distortion affects DC tracking stage 23 because the samples provided by timing recovery stage 25 on line 36 have large DC off-sets. As a result, the mean DC off-set value tracked by stage 23 in a narrow bandwidth track mode is not representative of actual forward channel mean DC off-set. Consequently, stage 23 generates an erroneous off-set voltage 32 thus distorting signal 33 even further. The feedback effect provided by stages 22, 23, and 25, may amplify the distortion further until synchronization with the forward channel is completely lost. In this case, the time consuming task of channel re-acquisition must be performed.

The present invention is a dynamic tracking method that reduces the distortion effects on DC tracking stage 23 and symbol timing recovery stage 25 that occur at the Tx/on and Tx/off times in subscriber 11. In accordance to the method of the present invention, the subscriber receiver portion (i.e. DC tracking stage 23 and symbol timing recovery stage 25) are notified a priori of a transmission event. Specifically, just prior to the Tx/on time the DC off-set tracking stage 23 and symbol timing recovery stage 25 are modified in the following manner:

symbol timing recovery stage 25 is set in a freeze mode such that it makes no further timing adjustments to the decision clock. It is essentially operates in a flywheel mode, and the Tx/on and Tx/off transients do not upset the decision clock synchronization with the forward channel data stream.

DC off-set recovery stage 23 is to set a wide bandwidth acquire mode such that it does track rapid changes in the DC.

Stages 23 and 25 are kept in these modes until a short time after the Tx/off time, typically about 10 to 20 milliseconds. By setting the symbol timing recovery stage to a freeze mode, the decision clock remains unaffected by signal 33's transients and the decision clock remains essentially the same through out this time period. The effect of setting the DC off-set recovery stage to a wider bandwidth mode is that the mean DC offset value is derived in a shorter period of time than it would be in a narrow bandwidth mode. The wider bandwidth DC tracking mode is therefore able to measure and compensate for sudden changes in DC off-sets due to transients. Consequently, the transients do not influence the tracked mean DC offset (33) within the wide bandwidth continuum of sample data values (31).

It should be noted that A/D converter stage 21, DC off-set removal stage 22, DC tracking stage 23, symbol decision stage 24, and symbol timing recovery stage 25 may either be implemented in software by performing digital signal processing (DSP) operations on the data or may be implemented in hardware. Thus, the present invention may be a method that applies to DSP operations or to hardware elements. However, it should be obvious to one in the art of communication design to apply the present invention to both of these implementations.

Although the elements of the present invention have been described in conjunction with a certain embodiment, it is appreciated that the invention may be implemented in a variety of other ways. Consequently, it is to be understood that the particular embodiment shown and described by way of illustration are in no way intended to be considered limiting. Reference to the details of this embodiment is not intended to limit the scope of the claims which themselves recite only those features regarded as essential to the invention.

What is claimed is:

1. In a system having a receiver for receiving an information signal on a first channel, said receiver including a first stage for tracking a characteristic of said information signal and a second stage for deriving information from said information signal, said information signal having an associated amplitude and frequency offset, a method for minimizing effects of distortion on said first and second stage, said distortion corresponding to a preknown distortion event and having associated event onset and event termination times, said method comprising the steps of:

setting each of said first and second stages into a first "distortion ready" mode for essentially the duration of said distortion event, wherein when in said first mode said first stage tracks said characteristic such that said characteristic is uneffected by said distortion;

setting each of said first and second stages into a second mode for times other than said duration of said distortion event.

2. The method as described in claim 1 wherein said first stage is for tracking a DC off-set voltage of said information signal within a given bandwidth and said second stage is a symbol timing recovery stage for deriving a decision clock signal in response to said DC off-set of said information signal.

3. The method as described in claim 2 wherein when in said "distortion ready" mode, said given bandwidth of said first stage is set to a first bandwidth and when in said second mode, said given bandwidth is set to a second bandwidth, said first bandwidth being narrower than said second bandwidth.

4. The method as described in claim 3 wherein when in said "distortion ready" mode said first stage does not adjust said decision clock signal and when said first stage is in said second mode, said decision clock signal may be adjusted.

5. The method as described in claim 4 wherein said preknown distortion event is caused by performing intermittent data transmissions on a second channel.

6. The method as described in claim 5 wherein said distortion corresponds to shifts in said DC off-set, said associated amplitude, and said frequency off-set in said information signal.

7. The method as described in claim 6 wherein said system is a subscriber in a duplex switched data communication system.

8. The method as described in claim 7 wherein said system further includes a controller for providing a first signal to said first stage for setting said first stage into said one of said first and second modes and for providing a second signal to said second stage for setting said second stage into said one of said first and second modes.

9. In a system having a receiver for receiving an information signal on a first channel, said receiver including a means for deriving a decision clock from said information signal, said information signal having an associated amplitude and DC off-set, a method for minimizing effects of distortion on said decision clock derivation means, said distortion corresponding to a preknown distortion event and having associated event onset and event termination times, said method comprising the steps of:

setting said decision clock derivation means into a first "distortion ready" mode for essentially the duration of said distortion event, wherein when said decision clock derivation means is in said first mode said decision clock is not adjusted and is thereby uneffected by said distortion;

setting said decision clock derivation means into a second mode for times other than said duration of said distortion event.

10. The method as described in claim 9 wherein said decision clock derivation means is a symbol timing recovery stage for deriving said decision clock signal in response to said DC off-set of said information signal.

11. The method as described in claim 10 wherein said preknown distortion event is caused by performing intermittent data transmissions on a second channel.

12. The method as described in claim 11 wherein said distortion corresponds to shifts in said DC off-set and said associated amplitude in said information signal.

13. The method as described in claim 12 wherein said system is a subscriber in a duplex switched data communication system.

14. The method as described in claim 13 wherein said system further includes a controller for providing a first signal to said decision clock derivation means to set it into said one of said first and second modes.

* * * * *